United States Patent
Obaidi et al.

(10) Patent No.: US 10,207,590 B2
(45) Date of Patent: Feb. 19, 2019

(54) DYNAMIC WIRELESS COMMUNICATIONS NETWORK WITH A PLURALITY OF AERIAL DRONES

(71) Applicant: T-Mobile USA, Inc., Bellevue, WA (US)

(72) Inventors: Ahmad Arash Obaidi, Bellevue, WA (US); Eric W. Yocam, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 86 days.

(21) Appl. No.: 14/884,518

(22) Filed: Oct. 15, 2015

(65) Prior Publication Data

US 2017/0111228 A1    Apr. 20, 2017

(51) Int. Cl.
| | | |
|---|---|---|
| *B60L 11/18* | (2006.01) | |
| *H04B 7/26* | (2006.01) | |
| *H04W 16/00* | (2009.01) | |

(52) U.S. Cl.
CPC ......... *B60L 11/182* (2013.01); *B60L 11/1861* (2013.01); *H04B 7/2606* (2013.01); *H04W 16/00* (2013.01)

(58) Field of Classification Search
None
See application file for complete search history.

(56) References Cited

U.S. PATENT DOCUMENTS

| | | |
|---|---|---|
| 2009/0251354 A1 | 10/2009 | Zahavi |
| 2011/0117834 A1 | 5/2011 | Martin |
| 2012/0271461 A1 | 10/2012 | Spata |
| 2014/0233412 A1 | 8/2014 | Mishra et al. |
| 2015/0215791 A1 | 7/2015 | Geller et al. |
| 2015/0236778 A1* | 8/2015 | Jalali ............... H04W 84/06 370/316 |
| 2016/0007387 A1* | 1/2016 | Adib ............... H04W 4/21 370/329 |
| 2016/0028471 A1* | 1/2016 | Boss ............... H04W 84/06 455/406 |
| 2016/0046387 A1* | 2/2016 | Frolov ............. G08G 5/0069 244/59 |
| 2016/0050012 A1* | 2/2016 | Frolov ............. H04B 7/18506 455/431 |
| 2016/0073271 A1* | 3/2016 | Schultz ............ H04L 63/105 455/404.1 |

(Continued)

OTHER PUBLICATIONS

"International Search Report and Written Opinion" for PCT Application No. PCT/US2016/057153 dated Mar. 23, 2017, 11 pages.

*Primary Examiner* — Steven H Nguyen
(74) *Attorney, Agent, or Firm* — Han Santos, PLLC (57) ABSTRACT

A system and method for establishing a dynamic wireless communication network with a plurality of autonomous aerial vehicles, such as drones. The drones can dynamically change the size and availability of the communication network, and work with an existing communication network, such as cellular telecommunications or internet protocol networks. The drones can therefore create and maintain a robust network in response to a variety of needs, such as emergency response areas or large sporting events. Further, the drones can establish communication hotspots for mobile devices, and can alternately be configured to create a data pipeline.

14 Claims, 6 Drawing Sheets

(56) References Cited

U.S. PATENT DOCUMENTS

2017/0013476 A1* 1/2017 Suthar .................. H04W 24/02
2017/0111102 A1* 4/2017 Fan .................... H04B 7/18504
2017/0208512 A1* 7/2017 Aydin ............... H04W 36/0055

* cited by examiner

DYNAMIC WIRELESS COMMUNICATIONS NETWORK WITH A PLURALITY OF AERIAL DRONES

BACKGROUND

Wireless communication networks, such as cellular telecommunication networks and wireless internet protocol networks, are typically configured from a geographically fixed radio tower or other radio-wave propagating and receiving device. The fixed device will have bidirectional radio signals in a specific communication protocol, such as "time division multiple access" (TDMA, also part of GSM) or "code division multiple access" (CDMA) for cellular telecommunications, or TCP/IP for internet networks. In a TCP/IP protocol, the fixed device may also dynamically assign network addresses to other communication devices that are using the network. Some fixed devices include equipment to support several types of multiple wireless networks, for example, both a GSM and CDMA network, or the cellular networks and a wireless internet network such as those using the WiMAX (IEEE 802.16) standard.

One problem that arises in a wireless network based on geographically-fixed communication devices is that there are a fixed number of communication channels, time slots, and/or addresses to allocate to devices that use the wireless network. If a large number of communication devices need to use the network simultaneously, such as occurs in an emergency response area or a large event like a sporting event or concert, there are insufficient communication channels and address for all the devices present in the geographic area of the wireless communication network. In the worst-case scenarios, the equipment of the fixed device may become overwhelmed by the communication requests from the mobile devices and completely fail.

Another problem occurs where there is a geographical area that has very little or no wireless communication resources and a wireless network is needed to be dynamically created and maintained, such as a remote emergency response or search and rescue site. It is very difficult in advance to determine the resources needed to maintain the wireless network as there no precedence for rate of usage or overall bandwidth needed.

There are extant portable and temporary wireless communication devices that can set up and maintain a wireless network for a geographic area, and in some instances, provide additional support to an existing wireless communication network. Examples of these devices are mobile radio towers that are driven to a geographic area and setup to host the network, typically being a monodirectional or bidirectional emergency frequency radio communication network for push-to-talk or other handheld devices. The portable and temporary tower can also host cellular telecommunications and can support existing fixed geographical wireless network devices. There are also aerial-devices creating an aerial-based wireless network for a geographical area using aerial vehicles, such as airplanes, helicopters, blimps, and satellites.

A problem with both land and air based temporary wireless network devices is that they have limited resources and cannot dynamically adapt the network to surging network usage. Nor do these devices address a change in the geographical network if the wireless network providing device is moving, or coordinate with other mobile wireless network equipment to quickly and efficiently handle the problems of needed increased network bandwidth or other geographical shifting of the temporary wireless network.

BRIEF DESCRIPTION OF THE DRAWINGS

The Detailed Description is set forth with reference to the accompanying figures.

DETAILED DESCRIPTION

Figure 1:
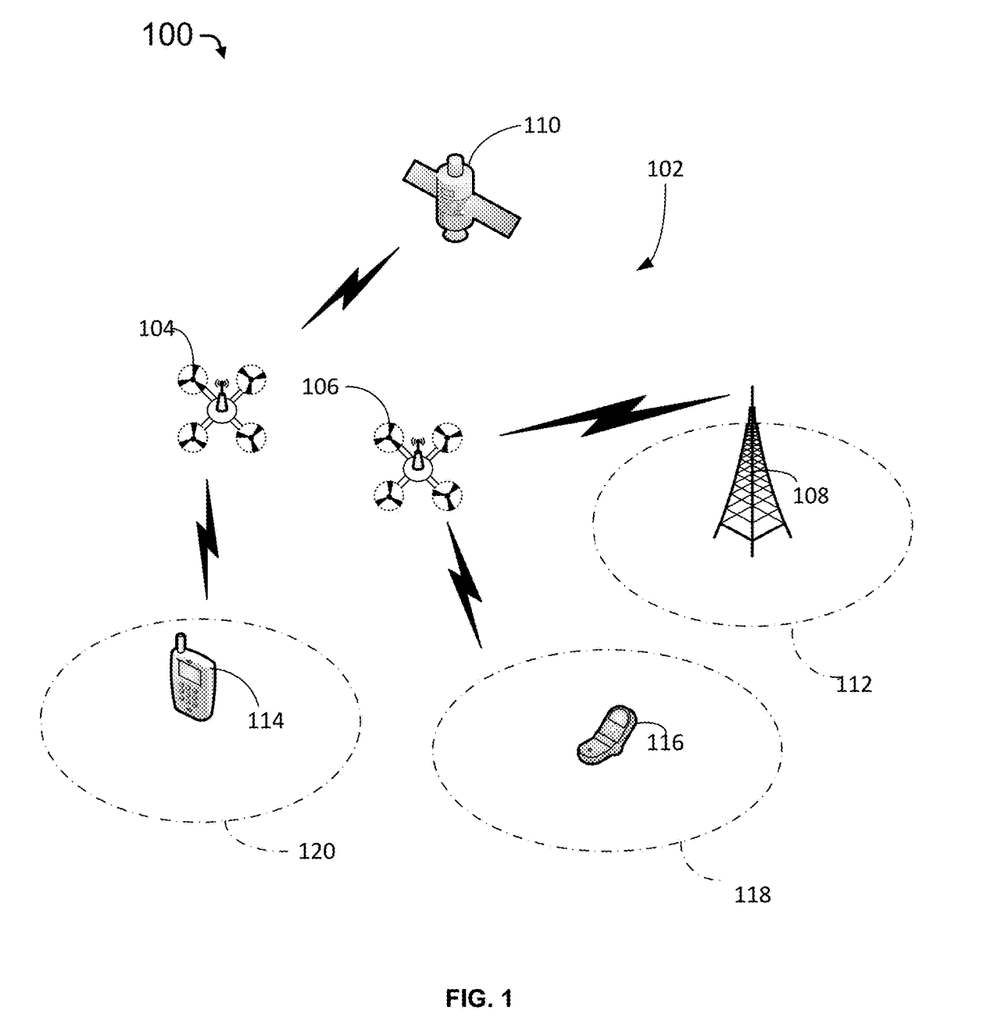
FIG. 1 is one embodiment of the dynamic wireless communication network with a plurality of aerial drones, illustrating a plurality of drones creating several wireless hotspots for mobile communication devices in several geographical areas with the drones relaying signals to both land based radio towers and other aerial-based satellites.

Referring now to the drawings which describe the present system and methods in more detail, FIG. 1 is a representative diagram of one embodiment of the dynamic wireless communication network 102 with a plurality of aerial drones 104, 106 creating several wireless hotspots 118, 120 for mobile communication devices, such as smartphone 114 and cell phone 116, in several geographical areas with the drones 104, 104 relaying signals to both land based radio towers, such as tower 108, and other aerial based satellites, such as satellite 110. The drones 104, 106 are shown as quadcopter drones, which are commonly in use, but can be any autonomous or semi-autonomous flying vehicle, such as a single or multirotor drone, fixed wing aircraft, or blimp/lighter-than air vehicle. It is preferable that the drones 104, 106 are at least semi-autonomous in flight such that the computational overhead or pilot resources needed to fly the drones 104, 106 as described herein are kept to a minimum.

In one embodiment, the system 102 allows one or more wireless networking hotspots 118, 120 outside of the geographical wireless region 112 of the fixed tower 110. As is shown further herein, the drones 104,106 can also supplement the available bandwidth of an existing tower 108 region 112 if the network is saturated with mobile users of the network. The drones 104, 106 can add to the existing footprint of the wireless network, such as extending a TDMA, CDMA, OFS, etc., cellular network, or can set up an entirely different communication network such as WIFI or WIMAX internet protocol network.

Figure 2:
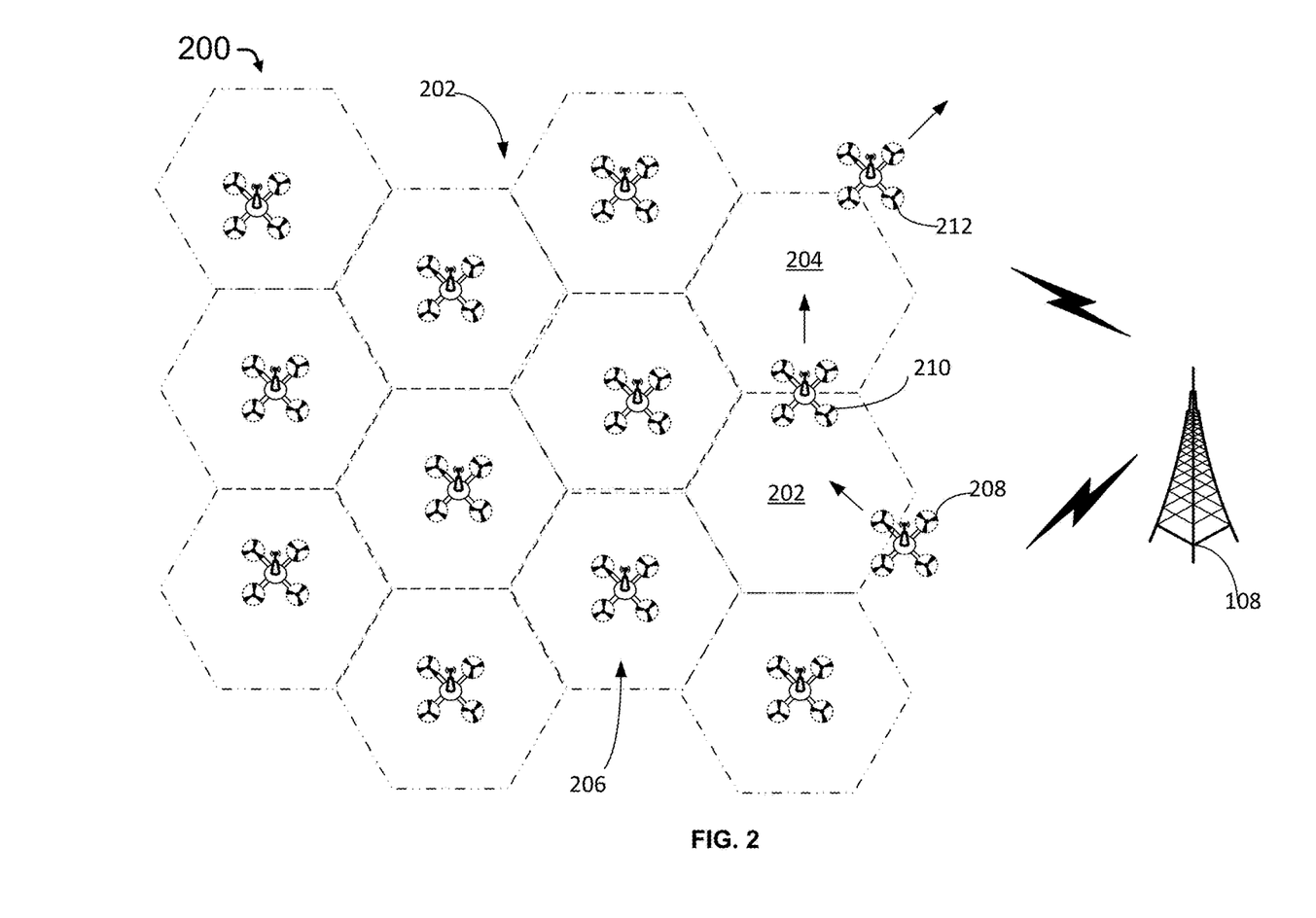
FIG. 2 is a representative diagram of one embodiment a plurality of drones interacting with a fixed radio tower and other drones to guarantee minimum wireless coverage of a geographical area.

FIG. 2 is a representative diagram of one embodiment a plurality of drones 206 interacting with a fixed radio tower 108 and other drones 208 to guarantee minimum wireless coverage a series of cells 202 over a geographical area. As shown here, each drone is in roughly the geographic center of the cell such that a comprehensive coverage of the area is created and maintained. The drones 206 and tower 108 can interact to effect mobile device handover of ongoing communications, such as phone calls or data streams, between the cells 202. Further, the tower 108 can also work in an autonomous fashion to move drones into and out of cells to maintain the network, such as shown in cells 202 and 204.

Drone 212 is shown as needing to return for recharging and is leaving cell 204, and drone 210 is shifting over from cell 202 to cover the cell as drone 210 shifts out, thereby maintaining wireless network integrity in cell 204. Newly charged drone 208 then enters cell 202 to maintain the wireless network in cell 202. Through such method, the drones that are soonest to need recharging can be routed thorough the cells to the periphery of the geographical area of the wireless network, or to the cells closest to the recharging base station. The system and method can also program a specific flight plan for all of the drones 206 establishing the wireless network over the geographic area to insure constant cell coverage. In another embodiment, the drones 206 can implement an autonomous execution of a coverage flying pattern among themselves in response to a drone needing to return to base for charging or for area failure.

The geographic area for the cells 202 can be an area that does not normally have any wireless network coverage or be an existing coverage area that needs additional hotspot points to handle mobile device communication traffic. Examples of a new area being needed could be an emergency site or a battlefield in a remote region. Examples of an existing area that might need additional hotspot support could be a concert, urban emergency, sporting event, traffic jam, or large rally.

Figure 3:
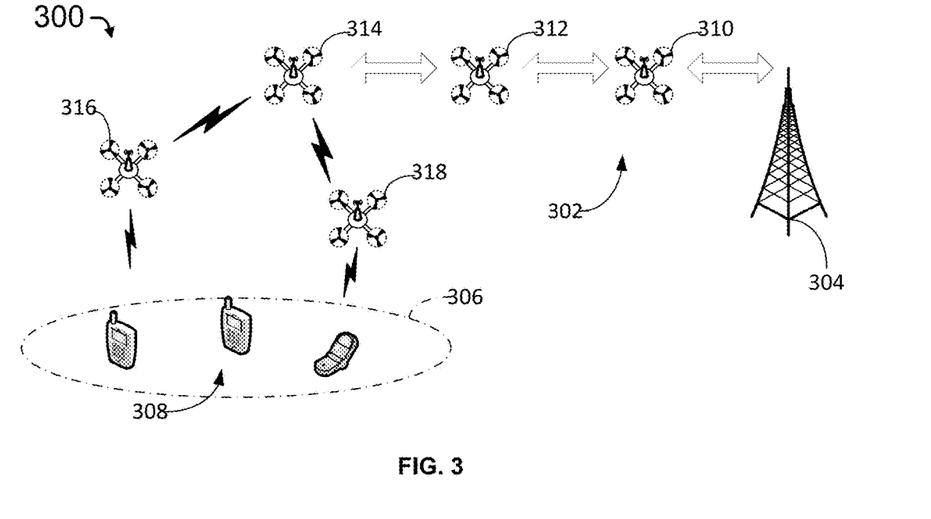
FIG. 3 is a representative diagram of one embodiment of a system of using a series of directionally aligned drones configured to create a communication data pipeline to other hotspot-creating drones located in a remote geographic area.

FIG. 3 is a representative diagram of one embodiment of a system 302 of using a series of directionally aligned drones 310, 312, 314 configured to create a communication data pipeline from a tower 304 to other hotspot-creating drones 316, 318 located in a remote geographic area 306. In this manner, the drones 316, 318 can create a wireless hotspot for mobile devices 308 located in the geographic area 306. In this embodiment, a plurality of drones, such as drones 310, 312, 314 can host either a mono-directional or bidirectional data flow only from and to the tower 304 from the other hotspot-creating drones 316, 318. In this configuration, the drones 310, 312, 314 will not host any intermediate communication traffic from mobile devices in order to maximize the resources available for the data pipeline to and from the tower 304 and wireless network created by drones 316, 318.

The aerial configuration for the wireless network and number of drones needed to create both the data pipeline of a specified bandwidth and those needed for the wireless network can be determined at the tower 304 control side, possibly through other computer devices in communication therewith (not shown). Alternately, the configuration of some or all of the drones can be accomplished by the drones and altered as network conditions are monitored. The drones can therefore send instructions to add more drones to the hotspot, like drones 316, 318 if the mobile devices 308 need more bandwidth, such as may occur with more rescue personnel entering an emergency area and using mobile devices. Likewise, if the overall data pipeline to the tower is becoming full, other drones can be deployed in the pipeline with drone 310, 312, 314 to increase the bandwidth.

Through the use of this embodiment, a robust wireless communication network can be established at a very remote region, such as may occur for an airline crash or other emergency site, or for a remote endeavor such as oil exploration or an archeological dig. The network could be a traditional radio network, such as a mono-directional push-to-talk system, or a cellular telecommunication network, or an internet wireless network, or a combination thereof.

Figure 4:
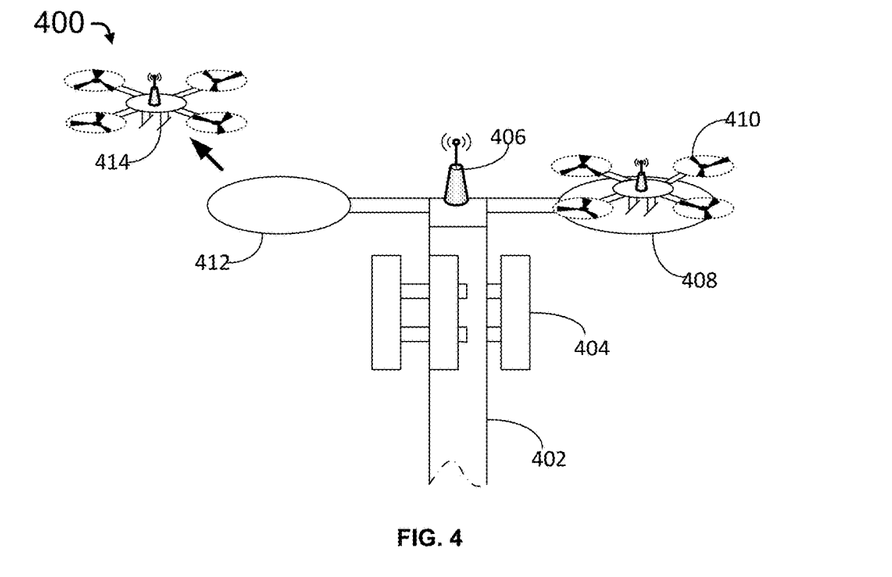
FIG. 4 is a representative diagram of one embodiment of a cellular base tower hosting a plurality of drones that can recharge at the tower and be deployed to increase the bandwidth and/or geographical reach of the cellular network when needed.

FIG. 4 is a representative diagram of one embodiment of a cellular base tower 402 (or Base Transceiver Station) hosting a plurality of drones 410, 414 that can recharge at the tower 402 on base pads 408, 412 and be deployed to increase the bandwidth and/or geographical reach of the cellular network when needed. The tower 402 is shown as having a cellular telecommunication array 404 that can support, for example a TMDA or CDMA cellular network. The tower 402 also includes, in this embodiment, a WiMAX antenna 406 such that it can selectively create a WiMAX TCP/IP wireless network with deployment of the drones 410, 414. Alternately, the drones 410, 414 can be used to enhance the bandwidth of the existing cellular network, and/or create wireless or cellular hotspots as needed within the realistic operative range of the drones from the tower.

As shown here, the drones 410, 414 return to the tower 402 to rest on the base pads 408, 412. The drones 410, 414 recharge on the base pads 408, 412 through inductive charging. The base pads 408, 412 will include an inductive coil (not shown) that will inductively couple with a parallel induction coil in the drones 410, 414 (not shown) when the drones are at rest on the base pad, such as shown by drone 410 resting on base pad 408. Other type of drones and methods of refueling, changing batteries, or recharging can be used. Further, the recharging can be done at another site, not necessarily on a base pad at the tower 402. The control system for determining the flying and recharging of the drones can be resident at the tower 402, or elsewhere in a computer network. Multiple towers and drones can also interact over a large wireless network, such as the cell network 202 shown in FIG. 2.

Figure 5:
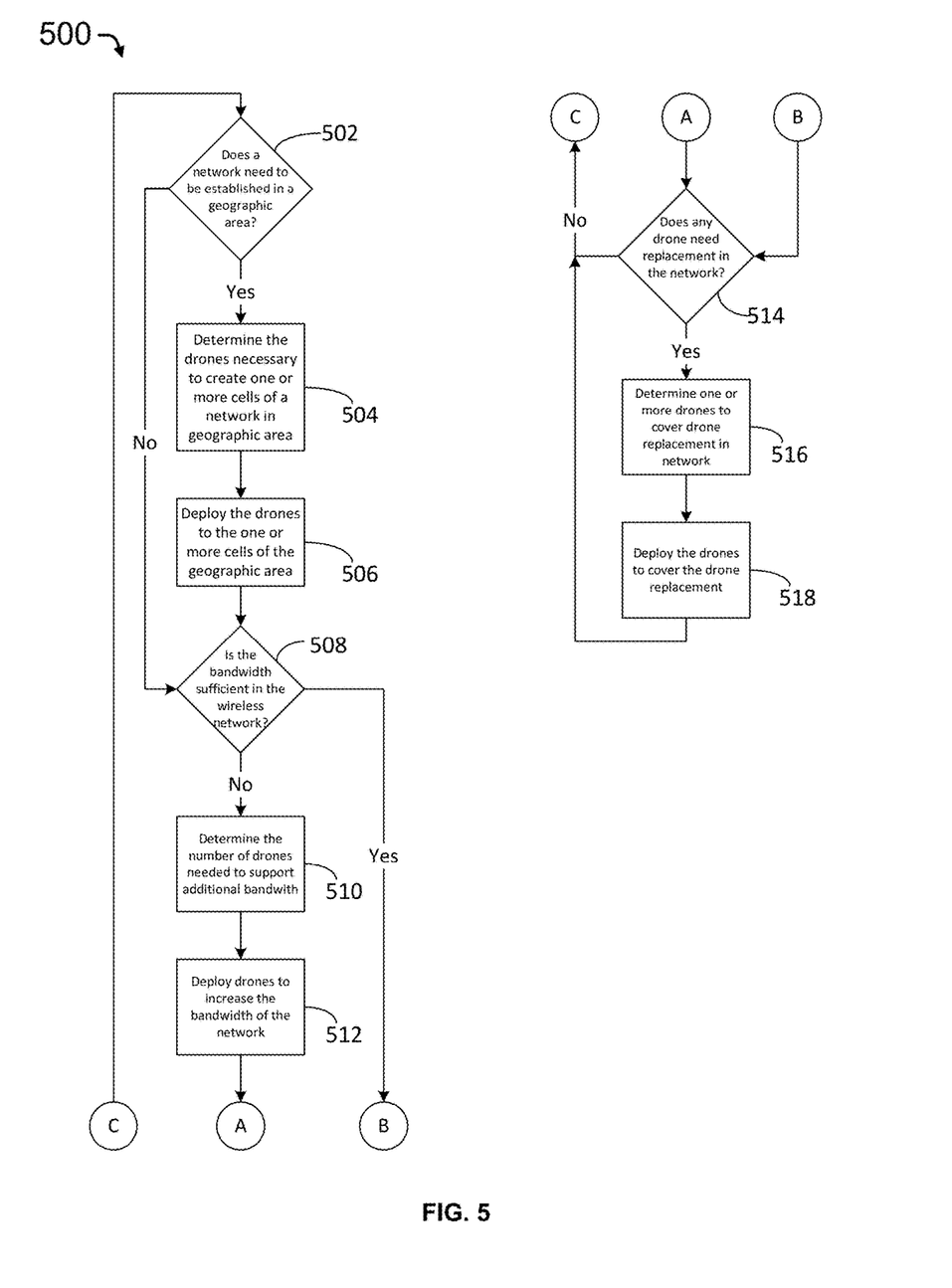
FIG. 5 is a flowchart of one embodiment of an algorithm for maintaining the geographical wireless network with a plurality of drones as shown in FIG. 2.

FIG. 5 is one embodiment of an algorithm for maintaining the geographical wireless network with a plurality of drones as shown in FIG. 2. The process starts with a decision as to whether a wireless network needs to be established in or extended to a geographic area, as shown at decision 502, which is shown here as an iterative process in that it is repeated. If a wireless network is not needed at decision 502, then the process advances to decision 508. If a wireless network is needed at decision 502, then a determination is made as to the number of drones necessary for deployment to create one or more cells of a wireless network in a geographical area, like cells 202 in FIG. 2. The determination step 504 can also be used to configure a wireless network as well, or a cellular network as shown in FIG. 2.

The system 102 then deploys the drones, such as the plurality of drones 206 in FIG. 2, to the one or more cells of the wireless network to establish communications with mobile devices, such as mobile devices 114 and 116 in FIG. 1, as shown in step 506, and then proceeds to make a determination as to whether the bandwidth in the established network is sufficient, as shown at decision 508. If the bandwidth is sufficient at decision 508, the process advances to decision 514. If there is insufficient bandwidth at decision 508, then a determination is then made on the number of further drones needed to support the additional bandwidth needed, as shown at step 510. Then the drones are deployed to increase the bandwidth of the wireless network, as shown at step 512.

A decision is then made as to whether any drone establishing the wireless network needs replacing, as shown at decision 514. Such step is illustrated in the drone replacement of cell 204 in FIG. 2. This step can be done by communication to the drone seeking operational status information, e.g. level of battery charge, fuel remaining, operational characteristics, or can be done as an estimate based on the time of deployment and other known variables, e.g. weather, communication volume, etc., or a combination of both methods. If no drone needs replacing at decision 514, then the process returns to decision 502 to start the process over. Otherwise, if a drone needs replacement in the wireless network, the number of drones needed to cover the replacement is determined, as shown in step 516, and then the drones are deployed to cover the replacing as shown in step 518. Such deployment is illustrated in FIG. 2 where drone 46 is deployed to cover cell 202 while drone 210 is moved over to cover cell 204. After the replacement drones are deployed at step 518, the process returns to decision 502 to iterate and selectively establish and maintain a wireless network in a geographic area.

Figure 6:
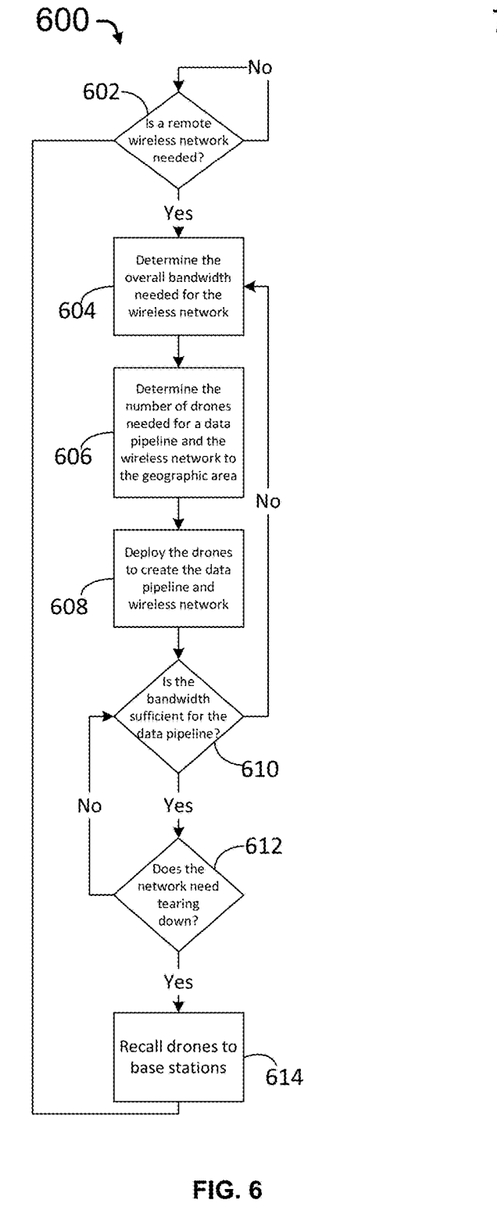
FIG. 6 is a flowchart of one embodiment of an algorithm for creating a communication data pipeline for other drones as shown in FIG. 3.

FIG. 6 is one embodiment of an algorithm for creating a communication data pipeline for other drones as shown in FIG. 3. A decision is made on whether a remote wireless network is needed (e.g., determine whether the dynamic wireless communication network should be created in or extended to a remote geographic area), as shown at decision 602. The term "remote" in this context means that the geographic area where the wireless network is needed is either underserviced with communications bandwidth or not serviced at all. If a remote wireless network is not needed at decision 602, the process simply iterates thereat. Alternately, this process could start with an external call to execute, as opposed to the system being in wait state. Otherwise, if the remote wireless network is needed at decision 602, then a determination is made as to the overall bandwidth needed for the remote wireless network, as shown at step 604. Then the number of drones needed to create the data pipeline and remote wireless network 308 is determined, as shown at step 606, and the drones are deployed, as shown at step 608.

A decision is then made as to whether there is sufficient bandwidth for the data pipeline once established, as shown at decision 610. If there is not sufficient bandwidth at decision 610, then the process iterates to step 604 to again determine and maintain adequate bandwidth. Otherwise, if there is sufficient bandwidth at decision 612, then a determination is made as to whether the remote wireless network 308 needs tearing down, as shown at decision 612. If the remote wireless network 308 does not need tearing down at decision 612, then the process returns to decision 610 to iterate and insure bandwidth until the remote wireless network 308 needs to be torn down. Once the network needs tearing down at decision 612, the drones are recalled to the base station, as shown at step 614. The base station could be embodied at cell tower 402 in FIG. 4 with base pads 408 and 412. After drone recall in step 614, the process returns to decision 602 to determine when a remote wireless network 308 is once again needed.

Figure 7:
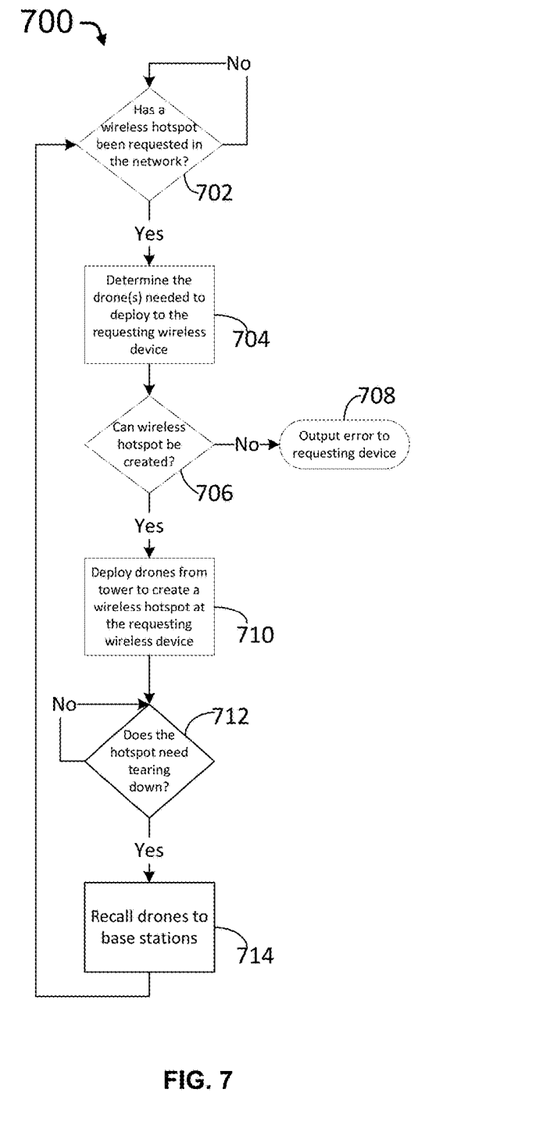
FIG. 7 is a flowchart of one embodiment of an algorithm for utilizing drones in conjunction with a fixed cellular tower as shown in FIG. 4.

FIG. 7 is one embodiment of an algorithm for utilizing drones, such as drones 410 and 414, in conjunction with a fixed cellular tower 402 as shown in FIG. 4 to specifically create a wireless internet hotspot within the drones' range from the tower 402. A decision is made as to whether a wireless internet hotspot has been requested by a mobile device, such as devices 114 and 116 in FIG. 1, within the cellular network of the tower 402, which means that the hotspot is requested in the geographical proximity to the tower 402. If a hotspot is not needed at decision 140, the process iterates (e.g., repeats the inquiry) thereat to await the need to create a hotspot. Otherwise, if a hotspot is needed at decision 702, then the number of drones are determined that are needed to be deployed in order to create the requested hotspot, as shown at step 704. A determination is then made as to whether the requested hotspot can be created, as shown at decision 706.

Decision 706 can be made on many potential variables, such as availability of drones, distance of the mobile device from the tower 402, the amount of bandwidth needed, and the like. If the wireless hotspot cannot be created at decision 706, then an error is output to the requesting mobile device and the process is terminated, as shown at termination 708. Otherwise, if the hotspot can be created at decision 706, then the drones are deployed from the tower 402 to create the hotspot for the requesting mobile device, as shown at step 710. Then a decision is made as to whether the hotspot needs tearing down as shown at decision 712. If the hotspot does not need tearing down at decision 712, the process iterates (e.g., repeats the inquiry) thereat to await the need to tear down the hotspot. Otherwise, if the hotspot needs tearing down at decision 712, then the drones are recalled to the base station at the tower 402, as shown at step 714, which effectively tears down the hotspot. The process then returns to decision 702 to await the need to create another wireless hotspot at the request of the user of the mobile device.

It should be appreciated that other methods and actions can trigger the need for a hotspot other than a mobile device request, such as a third party request, specific time of day, or other criteria. Furthermore, the hotspot can be a wireless network utilizing any communication protocol, including the same protocol as the tower 402.

Figure 8:
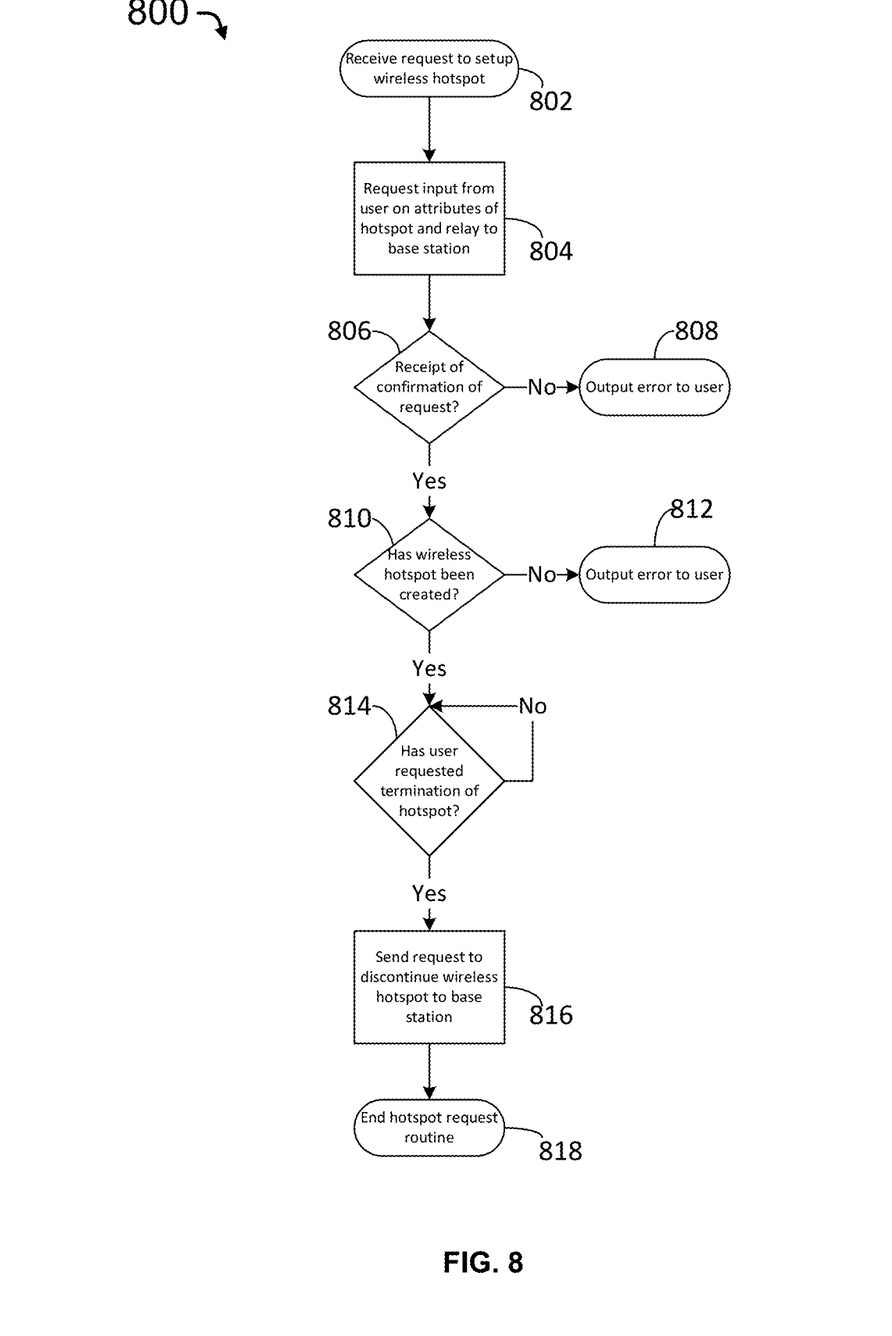
FIG. 8 is a flowchart of one embodiment of an algorithm used at a mobile device that can send a signal to request one or more drones travel to the geographical area of the mobile device to create a temporary wireless hotspot at the mobile device location.

FIG. 8 is an exemplary embodiment of an algorithm used by a mobile device, such as mobile devices 114 and 116 that can send a signal to activate a drone, such as drones 104 and 106, to travel to the geographical area of the mobile device to create a temporary wireless hotspot at the mobile device location. Thus, the process of FIG. 8 is one embodiment of the device-side process calling for a hotspot in FIG. 7. In this embodiment, the hotspot request is for the creation of an internet wireless network around the mobile device. However, any configurations of the networks of base station and wireless hotspot are potentially used.

The process starts with an application on the mobile device receiving a request from the user to setup a wireless hotspot for the user, as shown at start of process 802. Then, in this embodiment, the application requests the user to input the attributes the user wants in the hotspot, as shown at step 804, and relays them to the base station, such as tower 402 in FIG. 2. For example, the user can specify how large the hotspot needs to be, how many devices will be in the hotspot, what the hotspot is needed for such as streaming, and could even ask for the hotspot at a specific time and in a different location. After the attributes for the hotspot are gathered and relayed at step 804, a decision is then made as to whether the request for the hotspot was confirmed as received by the base station, as shown at decision 806. If no confirmation was received at the base station at decision 806, then an error output to the user and the hotspot request process terminates, as shown at termination 808.

Otherwise, if the request has been received at the base station at decision 806, then a decision is made as to whether the wireless hotspot has been created, as shown at decision 810. This can be accomplished by the mobile device pinging the drones to see if they are present, or by simply trying to open up a new communication channel on the wireless network. If the creation of the wireless hotspot is not confirmed by the mobile device at decision 810, then an error is output to the user of the mobile device and the hotspot request process terminates, as shown at termination 812.

Otherwise, if the wireless hotspot has been created at decision 810, then a determination is made as to whether the user has requested termination of the hotspot, as shown at decision 814. If the user has not requested termination of the hotspot at decision 814, then the process iterates (e.g., repeats the inquiry) at decision 814 until request of termination has been received. Alternately, decision 814 can be for a predetermined duration of the hotspot, and can occur if the one or more drones creating the hotspot indicate that they are unable to maintain the hotspot. Once the hotpot is to be terminated at decision 814, then the mobile device sends a request to the base station to discontinue the hotspot, as shown at step 816, and the hotspot request routine is terminated, as shown at termination 818. As shown in FIG. 7, the teardown of the hotspot is typically accomplished by recalling the drones. The mobile device can also make sure that all applications and processes on the mobile device are in a condition to lose access to the hotspot prior to it being removed.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of managing a dynamic wireless communication network by a computing device, the method comprising:
    receiving, from an autonomous aerial vehicle, an indication to setup a wireless hotspot within a new geographic area, based at least in part on a request from a mobile device within the new geographic area;
    determining that the dynamic wireless communication network is to be extended to the new geographic area, based at least in part on the indication;
    determining a bandwidth to accommodate the dynamic wireless communication network in the new geographic area;
    determining a number of autonomous aerial vehicles for (i) deployment to dynamically create one or more cells of the dynamic wireless communication network for the new geographic area and (ii) to create a data pipeline configured to provide the bandwidth from a cellular tower to the one or more cells of the dynamic wireless communication network; and
    deploying one or more autonomous aerial vehicles to create the data pipeline from the cellular tower and the one or more cells of the dynamic wireless communication network, based at least in part on the number of autonomous aerial vehicles.

2. The method of claim 1, further comprising:
    determining that an additional bandwidth is required to supplement an existing bandwidth in at least one cell of the dynamic wireless communication network; and
    determining a number of additional autonomous aerial vehicles to supplement the existing bandwidth; and
    deploying the number of additional autonomous aerial vehicles to the at least one cell of the dynamic wireless communication network, based at least in part on the additional bandwidth.

3. The method of claim 1, further comprising;
    determining that at least one autonomous aerial vehicle of the one or more autonomous aerial vehicles is to be replaced; and
    deploying an additional autonomous aerial vehicle to replace the at least one autonomous aerial vehicle.

4. The method of claim 3, wherein determining whether the at least one autonomous aerial vehicle of the one or more autonomous aerial vehicles that is to be replaced is based on at least one of:
    (i) a battery charge of the at least one autonomous aerial vehicle;
    (ii) a fuel level of the at least one autonomous aerial vehicle;
    (iii) a time of deployment of the at least one autonomous aerial vehicle; and
    (iv) ambient conditions.

5. The method of claim 1, wherein the new geographic area is at least one of:
    (i) an emergency site;
    (ii) an event site; and
    (iii) a remote endeavor site.

6. The method of claim 1, wherein the one or more autonomous aerial vehicles are configured to host a monodirectional or bidirectional data flow from and to the cellular tower.

7. The method of claim 2, wherein determining that the additional bandwidth is required to supplement the existing bandwidth in at least one cell of the dynamic wireless communication network is based on instructions received from one or more autonomous aerial vehicles.

8. The method of claim 1, wherein deployment of the one or more autonomous aerial vehicles is from the cellular tower.

9. The method of claim 1, further comprising recharging at least one of the one or more autonomous aerial vehicles of the dynamic wireless communication network at the cellular tower.

10. The method of claim 9, wherein the one or more autonomous aerial vehicles are recharged inductively.

11. The method of claim 1, further comprising:
    determining that an additional bandwidth is required to supplement the data pipeline from the cellular tower to at least one cell of the dynamic wireless communication network for the new geographic area;
    determining a number of additional autonomous aerial vehicles to supplement an existing bandwidth, based at least in part on the additional bandwidth; and
    deploying one or more additional autonomous aerial vehicles to the data pipeline, based at least in part on the number of additional autonomous aerial vehicles.

12. A computing device, comprising:
    a processor;
    a network interface coupled to the processor configured to enable communications via a dynamic wireless communication network;
    a storage device for content and programming;
    a program stored in the storage device, wherein execution of the program by the processor configures the computing device to perform acts comprising:

receiving, from an autonomous aerial vehicle, an indication to set up a wireless hotspot in a remote geographic area, based at least in part on a request from a mobile device within the remote geographic area;

determining that the dynamic wireless communication network is to be extended to the remote geographic area, based at least in part on the indication;

determining a bandwidth to accommodate the dynamic wireless communication network in the remote geographic area;

determining a number of autonomous aerial vehicles to create a data pipeline configured to provide the bandwidth from a cellular tower to the remote geographic area; and deploying one or more autonomous aerial vehicles to create the data pipeline from the cellular tower to the remote geographic area, based at least in part on the number of autonomous aerial vehicles.

13. The computing device of claim 12, wherein execution of the program further configures the computing device to perform acts comprising, upon deploying the one or more autonomous aerial vehicles:

repeatedly determining whether the remote geographic area has a sufficient bandwidth;

determining that the dynamic wireless communication network in the remote geographic area is to be removed or scaled down; and recalling at least one of the one or more autonomous aerial vehicles from the remote geographic area to the cellular tower.

14. The computing device of claim 12, further comprising:

detecting ambient weather conditions associated with the one or more autonomous vehicles; and determining that at least one of the one or more autonomous vehicles is to be replaced, based at least in part on the ambient weather conditions.

* * * * *